US012632443B1

(12) United States Patent
Pathak et al.

(10) Patent No.: US 12,632,443 B1
(45) Date of Patent: May 19, 2026

(54) COORDINATING TRANSACTIONS ACROSS DATABASES AND OPEN FORMAT TABLES

(71) Applicant: SAP SE, Walldorf (DE)

(72) Inventors: Amit Pathak, Pune (IN); Yogi Joshi, Waterloo (CA); Daniel James Farrar, Kitchener (CA); Anant Agarwal, Uttar Pradesh (IN); Sunabha Chatterjee, Kolkata (IN); Anisoara Nica, Waterloo (CA); Shailendra Kirtikar, Maharashtra (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/191,569

(22) Filed: Apr. 28, 2025

(51) Int. Cl.
*G06F 16/23* (2019.01)
(52) U.S. Cl.
CPC ................................ *G06F 16/2379* (2019.01)
(58) Field of Classification Search
None
See application file for complete search history.

(56) References Cited

U.S. PATENT DOCUMENTS

2013/0166523 A1* 6/2013 Pathak .................... G06F 9/466
  707/703
2022/0309478 A1* 9/2022 Xu ..................... H04L 43/0864

FOREIGN PATENT DOCUMENTS

CN 112883045 6/2021
CN 119807211 4/2025

OTHER PUBLICATIONS

"European Application Serial No. 25210181.1, Extended European Search Report mailed Feb. 19, 2026", 9 pgs.

* cited by examiner

*Primary Examiner* — Yu Zhao
(74) *Attorney, Agent, or Firm* — SCHWEGMAN LUNDBERG & WOESSNER, P.A.

(57) ABSTRACT

In an example embodiment, a solution is provided for coordinating transactions across both relational databases and open format tables on object storage. This technology addresses the challenge of integrating open table formats, such as Delta and Iceberg, with relational databases like SAP HANA. These technical challenges include subtleties imposed by database transaction isolation, asynchronous parallelism, and dealing with instabilities. More specifically, transactions are broken down a transaction into smaller, independent sub-transactions. Each sub-transaction is executed independently. If a sub-transaction fails, compensating actions are performed to undo its effects. This approach ensures that the overall transaction is applied atomically.

20 Claims, 7 Drawing Sheets

200

RECEIVE DDL TRANSACTION
202

TRIGGER LAKEHOUSE
COMMIT PROCESS 204

TRIGGER AUTONOMOUS
TRANSACTION 206

PERFORM DDL REGISTRATION 208

COMMIT DDL 210

UNREGISTER DDL 212

PERFORM REMOTE SUB-
TRANSACTION 214

PERFORM LOCAL SUB-
TRANSACTION 216

COMMIT (OR ROLL-BACK) META-
TRANSACTION 218

300

400

BEGIN DDL OPERATION 402 → DDL REGISTRATION 404 → METASTORE 406

N

REMOTE/LOCAL OPERATIONS 408

ROLLBACK 410

COMMIT 412

PENDING QUEUE 416

DAEMON 414

DDL UNREGISTRATION 418

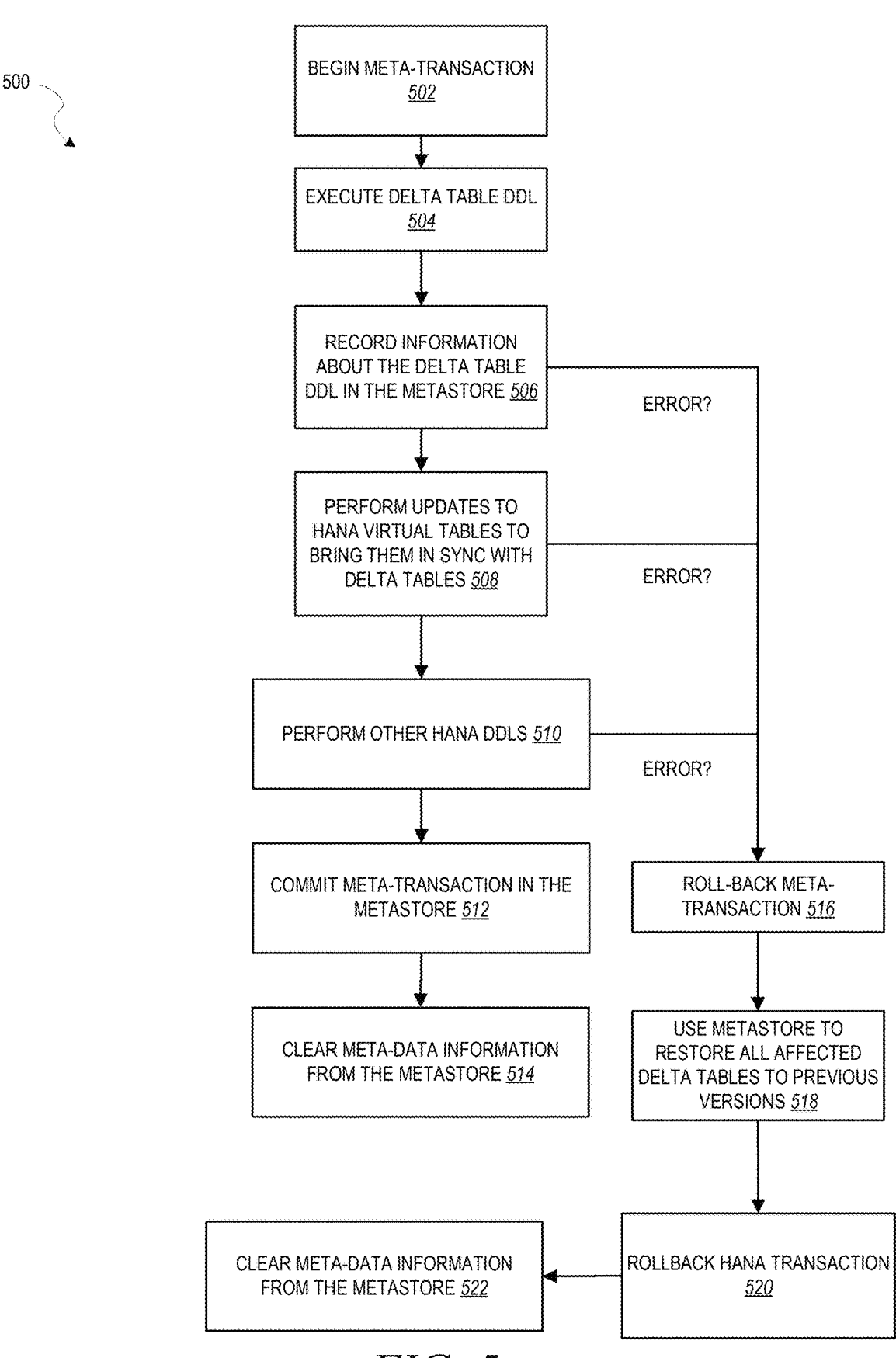

500

BEGIN META-TRANSACTION
*502*

EXECUTE DELTA TABLE DDL
*504*

RECORD INFORMATION ABOUT THE DELTA TABLE DDL IN THE METASTORE *506*

ERROR?

PERFORM UPDATES TO HANA VIRTUAL TABLES TO BRING THEM IN SYNC WITH DELTA TABLES *508*

ERROR?

PERFORM OTHER HANA DDLS *510*

ERROR?

COMMIT META-TRANSACTION IN THE METASTORE *512*

ROLL-BACK META-TRANSACTION *516*

CLEAR META-DATA INFORMATION FROM THE METASTORE *514*

USE METASTORE TO RESTORE ALL AFFECTED DELTA TABLES TO PREVIOUS VERSIONS *518*

CLEAR META-DATA INFORMATION FROM THE METASTORE *522*

ROLLBACK HANA TRANSACTION *520*

COORDINATING TRANSACTIONS ACROSS DATABASES AND OPEN FORMAT TABLES

TECHNICAL FIELD

The present disclosure relates to database management systems, specifically to coordinating transactions across relational databases and open format tables on object storage to ensure atomicity and consistency.

BACKGROUND

In recent years, the integration of open table formats, such as Delta and Iceberg, with relational databases has become increasingly important for managing large datasets in lakehouse architectures. A lakehouse architecture is a modern data management approach that merges the strengths of data lakes and data warehouses, offering a unified platform for both analytical and transactional workloads. It addresses the limitations of traditional data lakes and data warehouses by providing a single storage layer that manages all types of data, including structured, semi-structured, and unstructured data, typically using scalable and cost-effective object storage systems. Lakehouses support Atomicity, Consistency, Isolation, and Durability (ACID) transactions, ensuring data integrity and consistency across operations, which allows for reliable data updates and concurrent access by multiple users or applications.

BRIEF DESCRIPTION OF THE DRAWINGS

FIG. 5 is a diagram illustrating a method of managing transactions, in accordance with an example embodiment.

DETAILED DESCRIPTION

Figure 1:
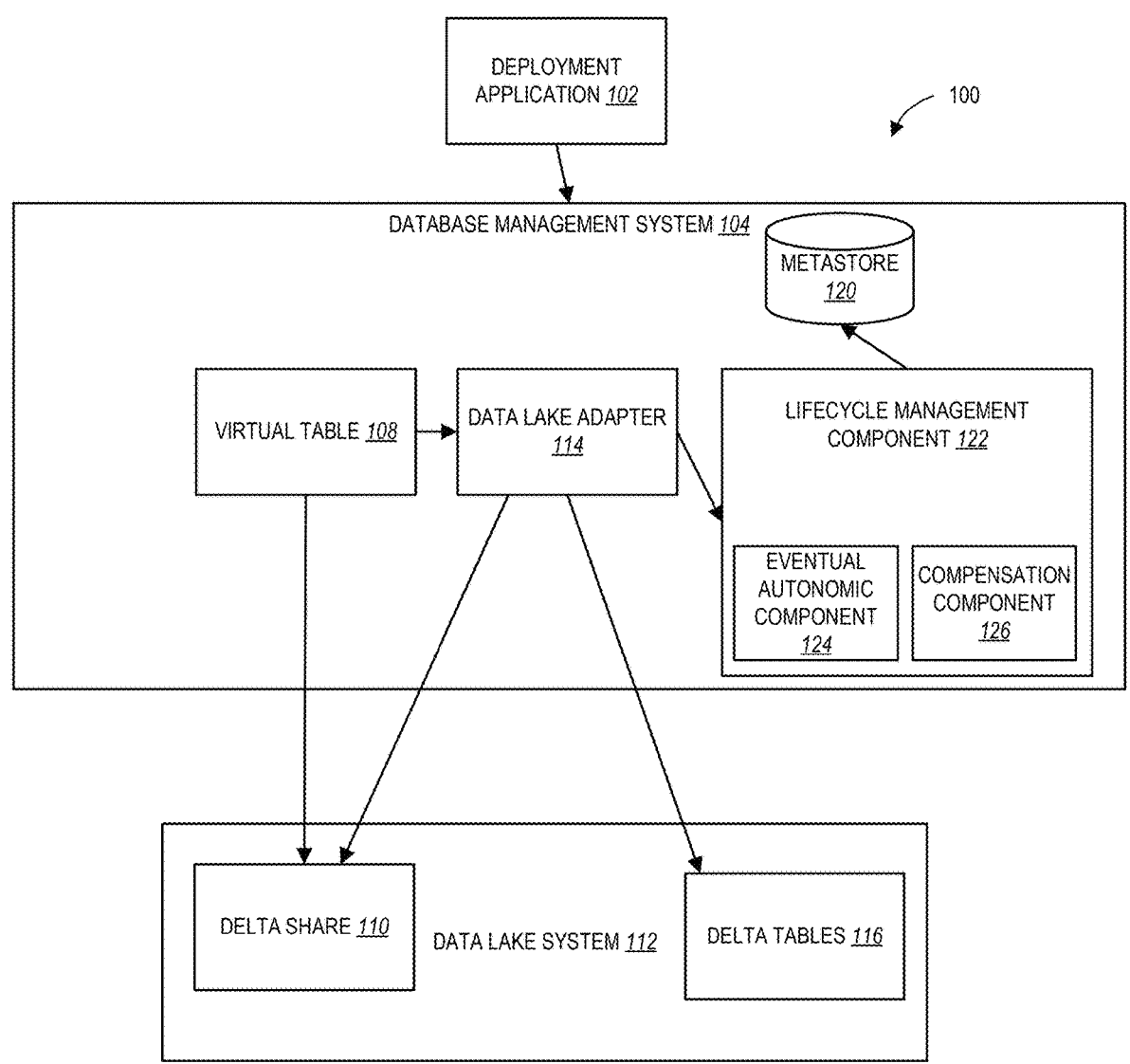
FIG. 1 is a block diagram illustrating a system in accordance with an example embodiment.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

The lakehouse architecture includes mechanisms for schema enforcement and evolution, enabling users to define and modify data schemas as needed while maintaining data quality and consistency. It supports both business intelligence and machine learning workloads, allowing organizations to perform a wide range of data analytics tasks on a single platform. The lakehouse architecture separates storage from compute resources, allowing for independent scaling of each component, which provides flexibility in resource allocation and cost management.

Lakehouses often utilize open data formats, such as Apache Parquet, Delta Lake, or Apache Iceberg, to ensure compatibility with various data processing engines and tools. They also support real-time data ingestion and processing, enabling timely insights and decision-making. By integrating the capabilities of data lakes and data warehouses, a lakehouse architecture offers a comprehensive solution for managing large volumes of diverse data, supporting both batch and real-time processing, and enabling advanced analytics and machine learning applications.

An open table format is a data storage format designed to facilitate efficient data management and processing in distributed environments, particularly in data lake and lakehouse architectures. These formats are characterized by their ability to support multi-engine read and write operations, allowing different data processing engines to access and manipulate the data concurrently. Open table formats are typically used to store large datasets on object storage systems, providing a flexible and scalable solution for data analytics.

Open table formats allow for multi-engine read and write operations on tables stored in object storage, providing significant advantages for analytical purposes. However, integrating these tables with relational databases, such as SAP HANA™ from SAP, SE of Walldorf, Germany, presents challenges, particularly in maintaining atomicity and consistency across transactions that span both native relational tables and remote open format tables. HANA is an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

Existing solutions often lack the capability to coordinate transactions across these disparate systems effectively. Open format tables typically do not support two-phase commit protocols or external coordinators, resulting in operations that commit as single atomic transactions without coordination. This limitation poses significant challenges for applications requiring a certain degree of atomicity and consistency in cloud deployments involving both relational databases and remote open format tables. As a result, there is a pressing need for a solution that can provide atomic transactions across these systems, ensuring reliable and consistent data management in complex deployment scenarios.

More specifically, it is desirable to be able to deploy a set of artefacts where certain objects are HANA objects and certain objects are Delta tables. It is also desirable to ensure atomicity over such a deployment so that it is possible to roll back the entire deployment, possible to roll back to a previous transaction save point within a deployment, and to maintain eventual consistency for the set of objects. This frees the developer and end users from concerns about orchestrating the atomicity of individual deployments. Additionally, it is desirable to support a set of Data Definition Language (DDL) transactions, specifically DDL transactions to create a table, drop a table, alter a table, and set a column default to null.

There are technical challenges, however, in accomplishing these goals. Each Delta table has an independent transaction domain from other Delta tables. Additionally, it is not possible to lock a Delta table similarly to locking a HANA table. Furthermore, the data lake system catalog, which hosts the Delta share(s), is another independent transaction domain. Additionally, a central transaction manager does not exist for a set of delta tables. Lastly, Delta transactions have only two isolation levels (serializable and write-serializable). As such, there are difficulties in exhibiting the atomicity property over a deployment comprising both Delta tables and HANA objects.

In an example embodiment, a solution is provided for coordinating transactions across both relational databases and open format tables on object storage. This technology addresses the challenge of integrating open table formats, such as Delta and Iceberg, with relational databases like SAP HANA. More specifically, transactions are broken down a transaction into smaller, independent sub-transactions. Each sub-transaction is executed independently. If a sub-transaction fails, compensating actions are performed to undo its effects. This approach ensures that the overall transaction is applied atomically.

The provided solution provides the capability to manipulate data in open file formats in a remote object store through a database in the same manner as the data in the database is manipulated. It provides a seamless transactional experience incorporating both normal database objects as well as objects residing remotelyin the object file format. It ties together the different transaction domains, despite respective transactions being committed independently. Thus, the multiple different transaction domains, which includes the relational database as well as one or more remote object stores in one or more data lake systems, are tied together and made to look like a single transactional domain, without the effort of actually making it a single transactional domain.

The Saga pattern is a design pattern used in distributed systems, particularly microservices architectures, to manage long-running transactions across multiple services by breaking them into a sequence of local transactions, each with a compensating transaction for rollback in case of failure. If a transaction within the saga fails, the pattern ensures that compensating transactions are executed to revert the effects of previously completed transactions. This approach allows the system to handle failures gracefully and maintain consistency. The Saga pattern, however, suffers from several drawbacks. First, the Saga pattern relies on an external (central) orchestrator. Second, the Saga pattern is designed to manage transactions across different data lake systems but does not include functionality to simultaneously manage the transactions among both a local database and remote data lake systems.

In an example embodiment, a new pattern is established that manage long-running transactions across multiple services by breaking them into a sequence of local transactions, each with a compensating transaction for rollback in case of failure but does so without using an external orchestrator and also does so in a manner that manages transactions among both a local database and remote data lake systems. The compensation logic is also specific to data tables. Atomicity is ensured by writing transactions within the local relational database to a metastore separately, to provide additional safeguards against failure.

DDL is a group of Structured Query Language (SQL) statements that modifies the metadata of a database. Common DDL commands include CREATE (used to create database objects), ALTER (used to modify existing database objects), DROP (used to delete existing database objects), TRUNCATE (used to remove records from a table but keep its structure, COMMENT (used to add comments to database objects), and RENAME (used to rename a database object). DDL commands change the structure of a database rather than the data itself.

In an example embodiment, the aforementioned solution provides for DDL operations to be safely performed on multiple Delta tables, as well as providing for creation or updates of virtual tables pointing to the Delta Tables. DDL operations can also be performed on native HANA tables/objects. The solution overcomes several technical challenges to supporting atomicity behavior for such deployment scenarios. First, Delta log protocol supports only single table transactions. If an application needs to perform an update across multiple Delta Tables, then atomicity of such updates cannot be guaranteed. Second, the transactional domains of the Delta Tables and the Hana system are completely different. When a logical transaction spans a set of Delta tables and HANA artefacts, if it has to be rolled back then already committed Delta transactions on individual tables cannot easily be rolled back. Third, Delta tables cannot be locked during deployments. Thus, while a deployment operation corresponds to a set of Delta tables, each of those tables may get modified by other operations that are not part of the deployment. For example, when a Delta table is undergoing an ALTER operation as part of a deployment (such as when adding a column) in a single table transaction, the table may get modified by data update operations by another job.

A meta-transaction may be defined as a set of independent transactions, each corresponding to modifications to a Delta table, initiated by an application, where each transaction operates in its own transaction domain. From the perspective of the application, such independent transactions form a single logical transaction. In other words, a meta-transaction is a logical transaction spanning independent transactions.

For example, a meta-transaction could span a set of transactions performed to apply DDLs to a set of Delta tables. For ease of discussion, a transaction that is part of a meta-transaction may be called a sub-transaction.

In an example embodiment, the atomicity requirements for lifecycle management of Delta tables is provided by an orchestrator component for meta-transactions that ensures compensating transactions are performed in case the meta-transaction needs to be aborted for some reasons. These compensating transactions may include, for example, undoing sub-transactions to revert the actions of committed sub-transactions that are part of the meta-transaction.

As each sub-transaction commits independently of other sub-transactions, the overall the overall meta-transaction can be in a state where one of the sub-transactions can be seen as committed but another sub-transaction could be in-progress or aborted or rolled-back. However, this would be a transient state until the orchestrator performs compensating transactions to eventually bring the system back to a state where the meta-transaction is applied atomically. This atomicity behavior provided by such orchestration mechanism may be called "eventual atomicity" of a meta-transaction.

In context of life cycle management, a meta-transaction encapsulates a set of transactions over corresponding set of Delta tables part of a deployment. When HANA virtual tables are mapped to these Delta tables or other HANA artefacts are involved during a deployment, a HANA transaction is also needed. In this case, the HANA transaction is also part of the meta-transaction that updates Delta table(s) as well as HANA artefacts. Unlike that of HANA transactions, meta-transactions can provide only eventual atomicity guarantees.

The eventual atomicity orchestrator component discussed previously uses information about the set of actions that are part of sub-transactions because it needs to perform the compensating transactions as required. For this purpose, in an example embodiment, the actions of all the ongoing meta-transactions can be stored in a layer referred to as the metastore. The information in the metastore is used only to perform compensating actions (i.e., undo actions) over Delta Tables.

For example, the metastore could be a HANA table in the HANA System to which the deployment application could connect and orchestrate the deployment across HANA and Delta Tables. The metastore maintains a necessary state for the eventual atomicity orchestrator component to perform such logical undo operations; this includes a list of DDL operations performed on the Delta Tables and the version of the Delta table on which the DDL will be applied. For example, it may contain older/newer snapshot versions, DDLs, etc.

The metastore is populated as part of the DDLs processing.

FIG. 1 is a block diagram illustrating a system 100 in accordance with an example embodiment. A deployment application 102 deploys lifecycle management artefacts, such as Delta tables, virtual tables, and HANA artefacts, to the database management system 104. In an example embodiment, the database management system 104 may be the HANA service. Here, for example, the deployment application 102 wishes to perform a single operation to store data. At the database management system 104, this single operation is a meta-transaction that is comprised of two independent sub-transactions. The first sub-transaction creates a virtual table 108 within the database management system 104. The second sub-transaction creates a Delta share 110 in the data lake system 112. More specifically, a data lake adapter 114 may provide SQL application program interfaces (APIs) to perform DDLs on Delta tables, such as Delta tables 116. More specifically, new SQL DDL syntax may be supported which makes use of remote adapters to perform a Delta DDL execution on, for example, a Spark service. Here, one could create the Delta tables 116 as well as the virtual table 108 in a single DDL with the newly supported syntax and the data lake adapter 114, which is able to create the virtual files for read access but also request DDL execution remotely. As mentioned earlier, a metastore 120 is used to store transactions being written to the database management system 104 for future roll-back if needed.

A lifecycle management module 122 performs the aforementioned operations. It contains an eventual autonomic component 124, which performs and/or directs the sub-transactions and writes information about the appropriate sub-transactions to the metastore 120. A compensation component 126 then performs one or more compensation operations using the information in the metastore 120 in case of any issues.

Parameters for the compensation need to be available even if the operation rolls back. Hence, the registration is performed and committed in a separate internal transaction (which may be called an autonomous transaction) as opposed to performing it within the user transaction that may eventually be rolled back. Contrary to registration, unregistration needs to be performed atomically with the user operation (thus the entry is unregistered from the metastore if and only if the user operation commits). For this purpose, the unregistration is performed with the user transaction itself.

As a side-effect, the registration is not visible to the user transaction in certain vases. This can be understood in terms of the isolation property of database transactions. Since the autonomous transaction starts after the user transaction and commits independently, for certain (Stricter) settings of isolation level, the registration changes performed by it are not visible to the user transaction. This can be a problem for the unregistration process, since for the unregistration to drop the registered entry, the registered entry has to be visible. To overcome this issue, in an example embodiment the metastore 120 is structured as a log, and any state change of a registered entry inserts a new record in the log rather than modifying the entry in-place. Finally, a background job cleans up the entries that are marked as pending unregistration.

Figure 2:
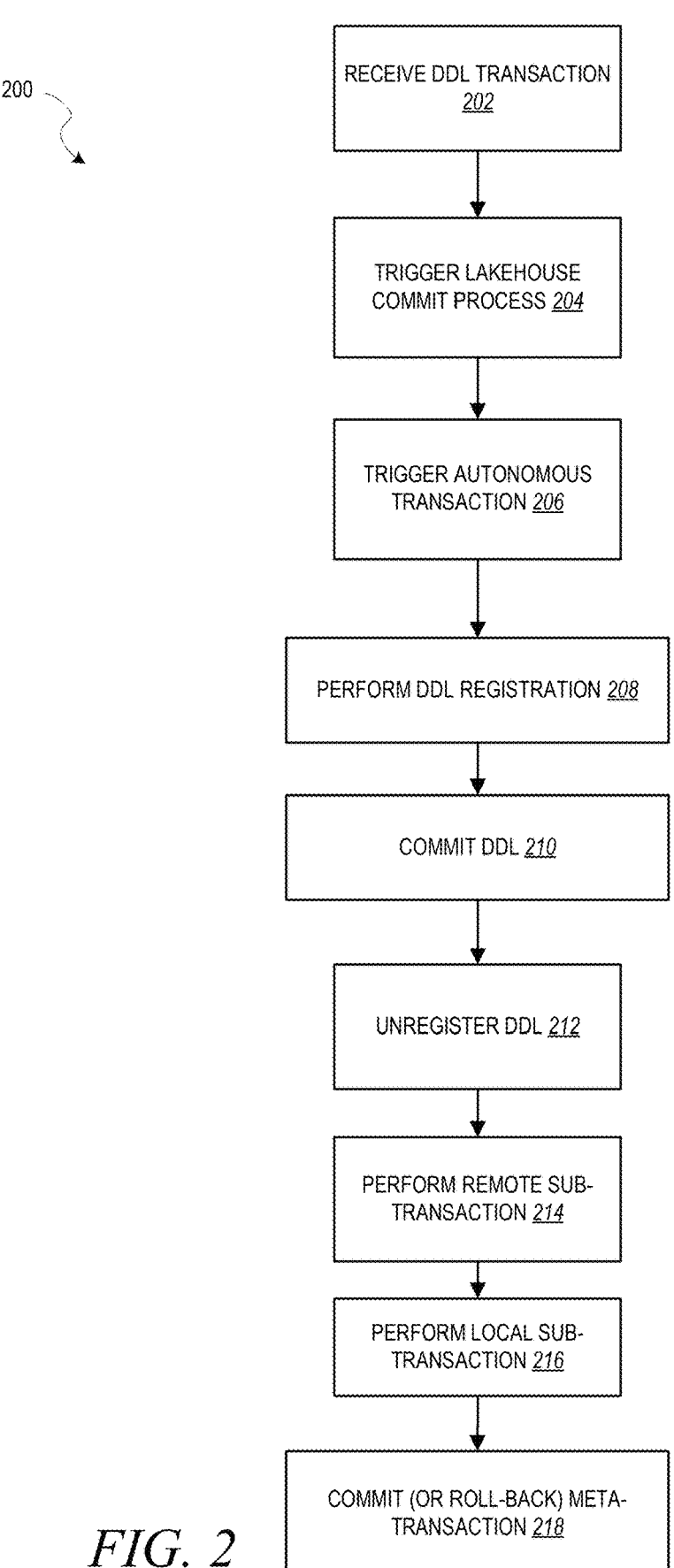
FIG. 2 is a flow diagram illustrating a method for performing registration and unregistration process, in accordance with an example embodiment.

FIG. 2 is a flow diagram illustrating a method 200 for performing registration and unregistration processes, in accordance with an example embodiment. At operation 202, a DDL transaction is received. At operation 204, a lakehouse commit process is triggered. At operation 206, an autonomous transaction is triggered. At operation 208, DDL registration is performed. At operation 210, the DDL is committed.

At operation 212, the DDL is unregistered. At operation 214, the remote sub-transaction is performed. At operation 216, the local sub-transaction is performed. At operation 218, the meta-transaction is committed (or rolled back). Notably, operations 212 and 218 are performed in the same transactional context.

Since the compensating meta-operations (performed upon rollback of a user operation) are triggered asynchronously, the database management system and the data lake system may be out of sync temporarily. During this time, further user operations on the remote object may be prohibited by checking the state of the remote object from the metastore. However, the remote object may be operated on by some other user transaction, in which case a registration entry for the object should be present in the metastore. Due to transaction isolation properties, this registration may not be visible to the current user transaction, and hence the check should be performed via an autonomous transaction.

In cases where the remote object has been modified and subsequently left in an erroneous state (pending compensating action) by some preceding operation within the current user transaction itself, then this entry will not be visible outside the current transaction, in particular to the autonomous transaction. Hence, a similar check needs to be performed within the current transaction as well.

Figure 3:
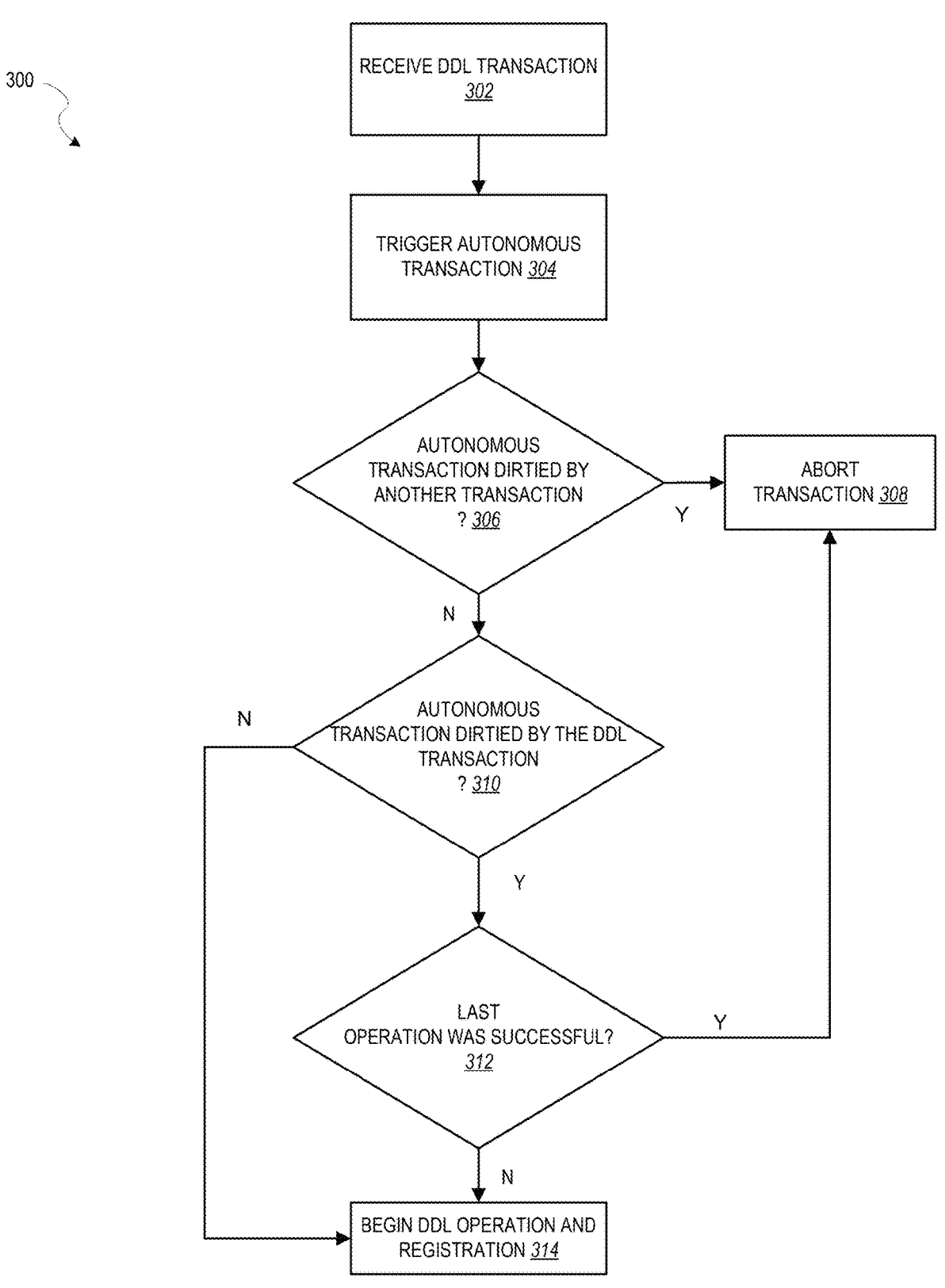
FIG. 3 is a flow diagram illustrating a method for performing a dirtiness check, in accordance with an example embodiment.

FIG. 3 is a flow diagram illustrating a method 300 for performing a dirtiness check, in accordance with an example embodiment. At operation 302, a DDL transaction is received. At operation 304, an autonomous transaction is triggered. At operation 306, it is determined if the autonomous transaction is dirtied by another transaction. If so, then at operation 308 the transaction is aborted. If not, then at operation 310 it is determined if the autonomous transaction is dirtied by the DDL transaction. If so, then at operation 312 it is determined if the last operation was not successful. If so, then at operation 308 the transaction is aborted. If not, or if at operation 310 it was determined that the autonomous transaction was not dirtied by the DDL transaction, then at operation 314 the DDL operation and registration can begin. Notably, operations 312 and 314 are performed in the DDL transaction context.

In some example embodiments, an in-memory queue is used such that whenever a DDL rolls back, a callback is triggered that inserts a unique identification into this queue. A background job is then invoked periodically. This background job performs three operations. The first is that, if this is the first invocation after server startup, then crash-recovery is performed by assuming that all registered entries in the metastore that are not in a pending post-commit or pending unregistration state are supposed to correspond to DDLs that could not commit successfully before the crash, and hence these are rolled back in serial order. The second is that the in-memory queue is drained, and the compensations are performed in serial order. The third is that the metastore is checked for all entries that are pending postcommit or unregistration, and the corresponding operations are performed serially.

There are some technical issues, however, with such embodiments. Specifically, the compensations on independent objects do not need to be serialized. Additionally, the interval of the periodic job introduces a nearly deterministic delay in the compensations/postcommits. These problems become especially critical because the connectivity to the SPARK ending and its performance characteristics are inherently slower. The serialized execution aggregates this even further. From the user perspective, the object remains unavailable for writes until the compensation is performed.

As such, in an example embodiment, a parallelized workflow is introduced. Here, callbacks are used for postcommit. Additionally, a contextual asynchronous workflow is introduced. Each compensation or post commit callback sets up a queue and triggers a job asynchronously to perform the operation. Any new compensation or postcommit arriving while the job is being executed simply enqueues the request. The asynchronous job consumes requests from the queue. Once empty, it drops the queue and terminates itself. Upon failing to trigger the job (e.g., due to a temporary resource crunch), the job is added to a pending queue. Each object has an independent workflow, thus implicitly ensuring complete parallelism.

A daemon is then placed in charge of ensuring that all jobs in the pending queue are eventually invoked. As before, in the first run after a reboot, the asynchronous execution in-memory state is bootstrapped from the metastore. Hidden configuration parameters may be introduced, such as a maximum number of concurrent asynchronous jobs and a maximum wait time to acquire a thread for an asynchronous job.

Figure 4:
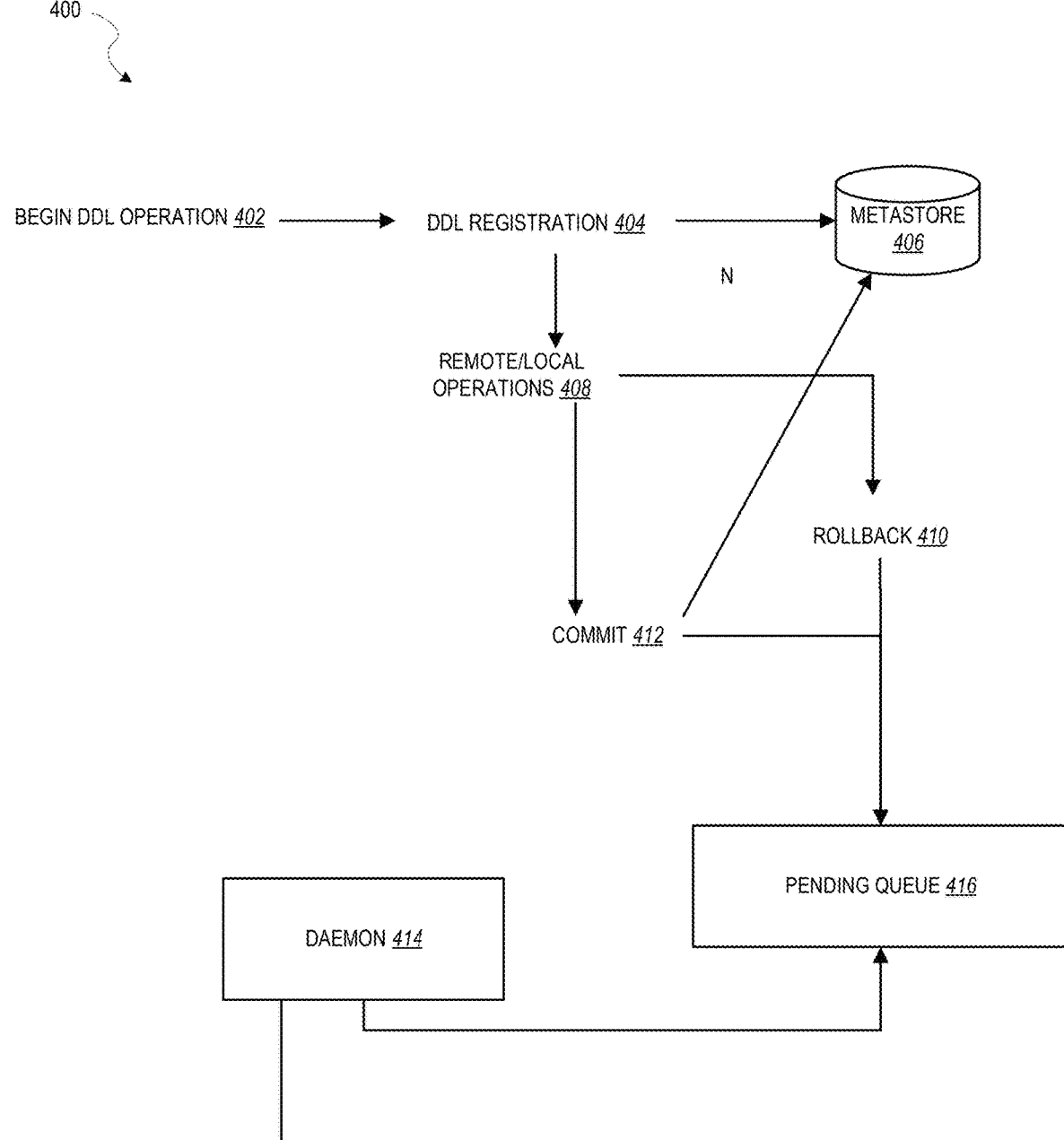
FIG. 4 is a diagram illustrating a parallelized workflow, in accordance with an example embodiment.

FIG. 4 is a diagram illustrating a parallelized workflow 400, in accordance with an example embodiment. At operation 402, a DLL operation is begun. At operation 404, DDL registration takes place. This puts information about the DDL in the metastore 406. At operation 408 remote and local operations are performed. Once these are completed, with a rollback 410 or a commit 412 is performed. In either case, the daemon 414 is involved to ensure that all jobs in a pending queue 416 are invoked. This is performed asynchronously. Then DDL unregistration 418 takes place.

The asynchronous operations of compensation and postcommit are system-initiated, but like all other external SPARK operations they are prone to various failures (network issues, etc.). Such failures can leave the remote object in an inconsistent state and further user operations from the HANA database are prohibited on it. Thus, it is useful to have necessary retry mechanisms in place.

Factors causing SPARK procedures to fail range far and wide. While many of these error conditions are transient and can be resolved by prompt retrying, others may require configuration changes or be caused by long-lasting outages. This calls for a multi-scale retry mechanism including both short and longer terms. The asynchronous execution framework provides for such functionality.

The self-healing may be accomplished in the term by, within an asynchronous invocation, retrying the operation some set number of times every set number of seconds, and the thread is occupied for the entire duration of the short-term retry. Long-term, the asynchronous job may be invoked again at an interval starting at some offset number of seconds, exponentially increasing the duration up to a maximum interval, until some retry max duration number of seconds has elapsed.

As to the compensation component, the user operation may comprise several steps, and the exact point of failure can occur anywhere among these, thus opening up the possibility of multipole erroneous states. The compensation component thus is designed to handle all of the possibilities correctly. The compensation action itself may also comprise several steps, and thus the compensation itself can also fail at any point. Also, the compensation may be attempted some arbitrary number of times, and each attempt may fail arbitrarily. In all of these cases, the subsequent attempt should try to perform the handling necessary.

Delta lake protocol includes very limited support for atomic operations or object locking that are used to guard against concurrent writes by multiple applications. The only meaningful tools available are the capability of adding some identifying information into a table's Delta log as part of a transaction writing to it, and the capability of indexing the Delta log by version of the table.

In an example embodiment, support may be introduced to provide consistency in the following way—for each Delta Lake DDL run from HANA, a unique GUID is generated that is inserted into the Delta log after the DDL executes. The compensation procedures then use this GUID as a "proof" of consistency based on the fact that the DDL execution itself and the GUID insertion into the log constitute a deterministic sequence of steps that should create a pre-determined number of versions. Hence, from the location of the GUID in the Delta log, the compensation logic can backtrack to check for any extraneous versions that could have been potentially created by concurrent user operations and report any error in such cases (to prevent data loss).

While the above mechanism is able to identify concurrent user operations during the DDL execution itself, it is far more difficult to guarantee the absence of user operations between a rolled-back DDL and its compensation. In principle, such a stringent consistency guarantee can be implemented as a pushdown-automata styled logic that models the Delta log as a stack and each DDL with its compensation as a push/pop (mirroring the semantics of nested-savepoint rollbacks). Physically speaking though, the Delta log is a monotonically increasing sequence of records, but that can be accounted for. The scheme may be described in pseudo-code as follows:

```
Compensate(DDL_x):
    for each entry in delta log (from latest to start):
        If stack is empty:
            if COMP_k found:
                if k == x:
                    return success // no-op, compensation already
                    done
                else:
                    push COMP_k
            else if DDL_k found:
                if k == x:
```

-continued

```
        perform comp
        add COMP_k tag
        return success
    else:
        return error // out of order compensation
    else:        // no DDL or COMP tag found
        return error    // version conflict - user
        operation between DDL an COMP
else:            // stack not empty
    say, top = COMP_k
    if DDL_k found:
        pop COMP_k
    else if COMP_m found (m != k):
        push COMP_m
    else:
        return error       // version conflict - user
        operation between DDL an COMP
    move to next entry     // past all entries for current COMP/DDL
    entry
```

FIG. 5 is a diagram illustrating a method 500 of managing transactions, in accordance with an example embodiment. Here, operations having a solid border are performed by External APIs used by the deployment application, whereas operations having a dashed border are performed by internal logic built into a lifecycle management component on a database management system.

At operation 502, a meta-transaction is begun by the deployment application. This also starts a HANA DDL transaction on the database management system-side. At operation 504, a delta table DDL is executed. At operation 506, information about the delta table DDL is recorded in the metastore.

At operation 508, updates are performed to HANA virtual tables to bring them in sync with the delta tables updated in operation 504. At operation 510, other HANA DDLs are performed. If no error occurs during operations 504, 508, or 510, then at operation 512 the meta-transaction is committed in the metastore, which also commits a HANA DDL transaction. At operation 514, the meta-transaction information is cleared from the metastore.

If an error occurs during one or more of operations 504, 508, or 510, then at operation 516, the entire meta-transaction is rolled back. At operation 518, the metastore is used to restore all affected delta tables to previous versions. At operation 520, the HANA transaction is rolled back. At operation 522, the meta-transaction information is cleared from the metastore.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one hardware processor; and a non-transitory computer-readable medium storing instructions that, when executed by the at least one hardware processor, cause the at least one hardware processor to perform operations comprising: receiving, at a database management system, a database transaction; splitting the database transaction into a plurality of independent sub-transactions comprising a first sub-transaction corresponding to an object in the database management system and a second sub-transaction corresponding to an object in a remote open table format storage system separate and distinct from the database management system; recording the second sub-transaction in a metastore of the database management system; sending the second sub-transaction to the remote open table format storage system for execution and updating of the second object; updating the first object on in the database management system by executing the first sub-transaction; based on a determination that either the updating of the first object or the updating of the second object has failed, performing a plurality of compensation transactions to restore the first object and the second object to earlier states, the compensation transaction to restore the second object being based on data in the metastore; and clearing all data from the metastore.

In Example 2, the subject matter of Example 1 comprises, wherein the plurality of independent sub-transactions further comprises a third sub-transaction corresponding to an object in a second remote open table format storage system separate and distinct from the database management system and the remote open table format storage system.

In Example 3, the subject matter of Examples 1-2 comprises, wherein the database management system is an in-memory database management system.

In Example 4, the subject matter of Examples 1-3 comprises, wherein the first sub-transaction and the second sub-transaction are both DDL transactions.

In Example 5, the subject matter of Examples 1-4 comprises, wherein the first sub-transaction acts to update a virtual table in the database management system when executed.

In Example 6, the subject matter of Examples 1-5 comprises, wherein the operations further comprise: performing one or more additional sub-transactions on the database management system; and wherein the determination comprises a determination that any of the updating of the first object, the updating of the second object, or the performing of the one or more additional sub-transactions has failed.

In Example 7, the subject matter of Examples 1-6 comprises, wherein the first sub-transaction and the second sub-transaction are performed asynchronously.

Example 8 is a method comprising: receiving, at a database management system, a database transaction; splitting the database transaction into a plurality of independent sub-transactions comprising a first sub-transaction corresponding to an object in the database management system and a second sub-transaction corresponding to an object in a remote open table format storage system separate and distinct from the database management system; recording the second sub-transaction in a metastore of the database management system; sending the second sub-transaction to the remote open table format storage system for execution and updating of the second object; updating the first object on in the database management system by executing the first sub-transaction; based on a determination that either the updating of the first object or the updating of the second object has failed, performing a plurality of compensation transactions to restore the first object and the second object to earlier states, the compensation transaction to restore the second object being based on data in the metastore; and clearing all data from the metastore.

In Example 9, the subject matter of Example 8 comprises, wherein the plurality of independent sub-transactions further comprise a third sub-transaction corresponding to an object in a second remote open table format storage system separate and distinct from the database management system and the remote open table format storage system.

In Example 10, the subject matter of Examples 8-9 comprises, wherein the database management system is an in-memory database management system.

In Example 11, the subject matter of Examples 8-10 comprises, wherein the first sub-transaction and the second sub-transaction are both DDL transactions.

In Example 12, the subject matter of Examples 8-11 comprises, wherein the first sub-transaction acts to update a virtual table in the database management system when executed.

In Example 13, the subject matter of Examples 8-12 comprises, performing one or more additional sub-transactions on the database management system; and wherein the determination comprises a determination that any of the updating of the first object, the updating of the second object, or the performing of the one or more additional sub-transactions has failed.

In Example 14, the subject matter of Examples 8-13 comprises, wherein the first sub-transaction and the second sub-transaction are performed asynchronously.

Example 15 is a non-transitory machine-readable medium storing instructions which, when executed by one or more processors, cause the one or more processors to perform operations comprising: receiving, at a database management system, a database transaction; splitting the database transaction into a plurality of independent sub-transactions comprising a first sub-transaction corresponding to an object in the database management system and a second sub-transaction corresponding to an object in a remote open table format storage system separate and distinct from the database management system; recording the second sub-transaction in a metastore of the database management system; sending the second sub-transaction to the remote open table format storage system for execution and updating of the second object; updating the first object on in the database management system by executing the first sub-transaction; based on a determination that either the updating of the first object or the updating of the second object has failed, performing a plurality of compensation transactions to restore the first object and the second object to earlier states, the compensation transaction to restore the second object being based on data in the metastore; and clearing all data from the metastore.

In Example 16, the subject matter of Example 15 comprises, wherein the plurality of independent sub-transactions further comprises a third sub-transaction corresponding to an object in a second remote open table format storage system separate and distinct from the database management system and the remote open table format storage system.

In Example 17, the subject matter of Examples 15-16 comprises, wherein the database management system is an in-memory database management system.

In Example 18, the subject matter of Examples 15-17 comprises, wherein the first sub-transaction and the second sub-transaction are both DDL transactions.

In Example 19, the subject matter of Examples 15-18 comprises, wherein the first sub-transaction acts to update a virtual table in the database management system when executed.

In Example 20, the subject matter of Examples 15-19 comprises, wherein the operations further comprise: performing one or more additional sub-transactions on the database management system; and wherein the determination comprises a determination that any of the updating of the first object, the updating of the second object, or the performing of the one or more additional sub-transactions has failed.

Example 21 is at least one machine-readable medium comprising instructions that, when executed by processing circuitry, cause the processing circuitry to perform operations to implement any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 6:
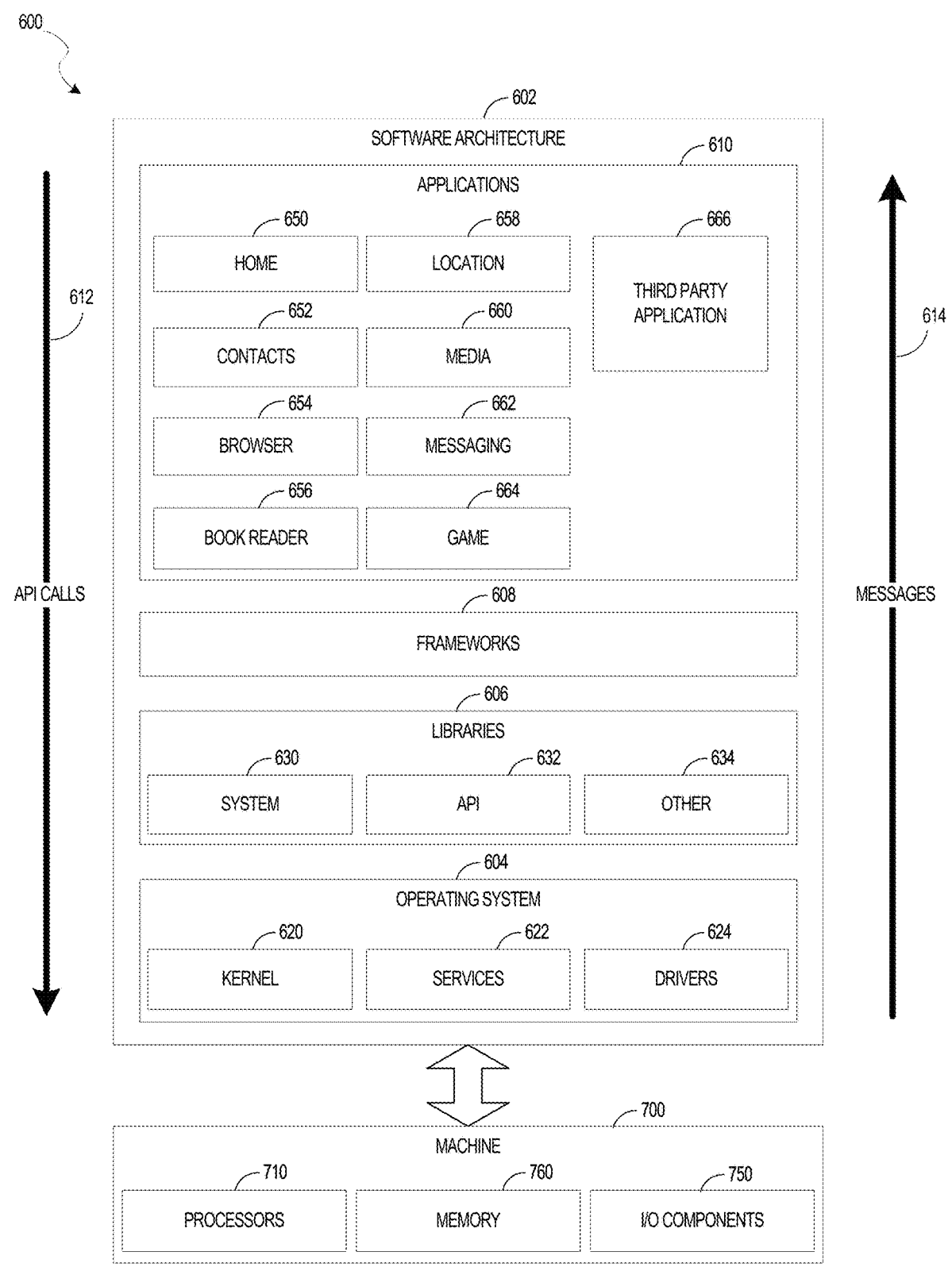
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various examples, the software architecture 602 is implemented by hardware such as a machine 700 of FIG. 7 that comprises processors 710, memory 730, and input/output (I/O) components 750. In this example architecture, the software architecture 602 can be conceptualized as a stack of layers where each layer may provide a particular functionality. For example, the software architecture 602 comprises layers such as an operating system 604, libraries 606, frameworks 608, and applications 610. Operationally, the applications 610 invoke API calls 612 through the software stack and receive messages 614 in response to the API calls 612, consistent with some examples.

In various implementations, the operating system 604 manages hardware resources and provides common services. The operating system 604 comprises, for example, a kernel 620, services 622, and drivers 624. The kernel 620 acts as an abstraction layer between the hardware and the other software layers, consistent with some examples. For example, the kernel 620 provides memory management, processor management (e.g., scheduling), component management, networking, and security settings, among other functionalities. The services 622 can provide other common services for the other software layers. The drivers 624 are responsible for controlling or interfacing with the underlying hardware, according to some examples. For instance, the drivers 624 can comprise display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some examples, the libraries 606 provide a low-level common infrastructure utilized by the applications 610. The libraries 606 can comprise system libraries 630 (e.g., C standard library) that can provide functions such as memory allocation functions, string manipulation functions, mathematic functions, and the like. In addition, the libraries 606 can comprise API libraries 632 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR] audio codec, Joint Photographic Experts Group [JPEG or JPG], or Portable Network Graphics [PNG]), graphics libraries (e.g., an OpenGL framework used to render in two dimensions [2D] and three dimensions [3D] in a graphic context on a display), database libraries (e.g., SQLite to provide various relational database functions), web libraries (e.g., WebKit to provide web browsing functionality), and the like. The libraries 606 can also comprise a wide variety of other libraries 634 to provide many other APIs to the applications 610.

The frameworks 608 provide a high-level common infrastructure that can be utilized by the applications 610, according to some examples. For example, the frameworks 608 provide various GUI functions, high-level resource management, high-level location services, and so forth. The frameworks 608 can provide a broad spectrum of other APIs that can be utilized by the applications 610, some of which may be specific to a particular operating system 604 or platform.

In an example, the applications 610 comprise a home application 650, a contacts application 652, a browser application 654, a book reader application 656, a location application 658, a media application 660, a messaging application 662, a game application 664, and a broad assortment of other applications, such as a third-party application 666. According to some examples, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit [SDK] by an entity other than the vendor of the platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
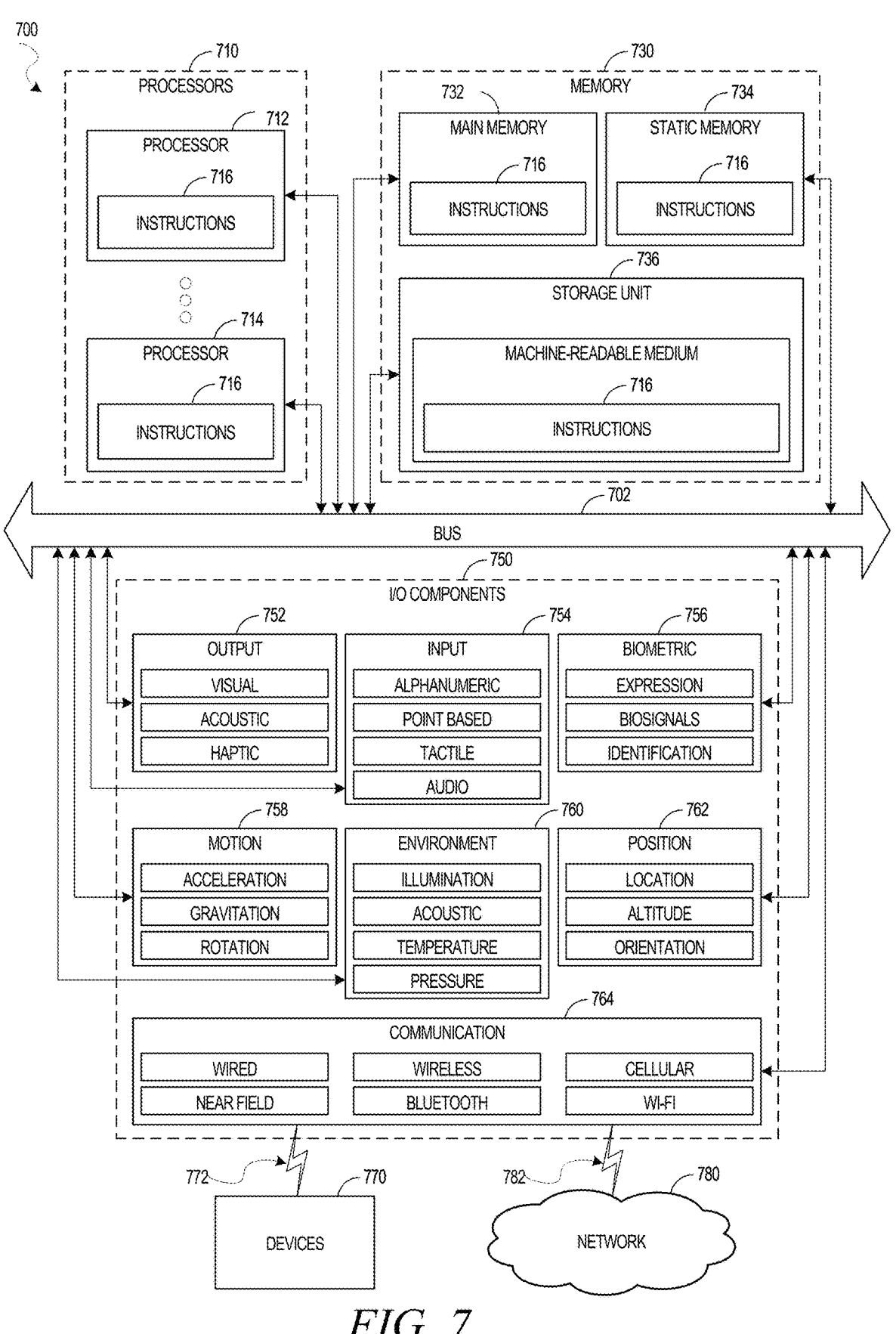
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein, according to an example. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5 and so forth. The instructions 716 transform the general, nonprogrammed machine 700 into a particular machine 700 programmed to carry out the described and illustrated functions in the manner described. In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specifies actions to be taken by the machine 700. Further, while only a single machine 700 is illustrated, the term "machine" shall also be taken to comprise a collection of machines 700 that individually or jointly execute the instructions 716 to perform any one or more of the methodologies discussed herein.

The machine 700 may comprise processors 710, memory 730, and I/O components 750, which may be configured to communicate with each other such as via a bus 702. In an example, the processors 710 (e.g., a central processing unit [CPU], a reduced instruction set computing [RISC] processor, a complex instruction set computing [CISC] processor, a graphics processing unit [GPU], a digital signal processor [SP], an application-specific integrated circuit [ASIC], a radio-frequency integrated circuit [RFIC], another processor, or any suitable combination thereof) may comprise, for example, a processor 712 and a processor 714 that may execute the instructions 716. The term "processor" is intended to comprise multi-core processors that may comprise two or more independent processors (sometimes referred to as "cores") that may execute instructions 716 contemporaneously. Although FIG. 7 shows multiple processors 710, the machine 700 may comprise a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may comprise a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may comprise a wide variety of components to receive input, provide output, produce output, transmit information, exchange information, capture measurements, and so on. The specific I/O components 750 that are comprised in a particular machine will depend on the type of machine. For example, portable machines such as mobile phones will likely comprise a touch input device or other such input mechanisms, while a headless server machine will likely not comprise such a touch input device. It will be appreciated that the I/O components 750 may comprise many other components that are not shown in FIG. 7. The I/O components 750 are grouped according to functionality merely for simplifying the following discussion, and the grouping is in no way limiting. In various examples, the I/O components 750 may comprise output components 752 and input components 754. The output components 752 may comprise visual components (e.g., a display such as a plasma display panel [PDP], a light-emitting diode [LED] display, a liquid crystal display [LCD], a projector, or a cathode ray tube [CRT]), acoustic components (e.g., speakers), haptic components (e.g., a vibratory motor, resistance mechanisms), other signal generators, and so forth. The input components 754 may comprise alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 750 may comprise biometric components 756, motion components 758, environmental components 760, or position components 762, among a wide array of other components. For example, the biometric components 756 may comprise components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may comprise acceleration sensor components (e.g., accelerometer), gravitation sensor components, rotation sensor components (e.g., gyroscope), and so forth. The environmental components 760 may comprise, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may comprise location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may comprise communication components 764 operable to couple the machine 700 to a network 780 or devices 770 via a coupling 782 and a coupling 772, respectively. For example, the communication components 764 may comprise a network interface component or another suitable device to interface with the network 780. In further examples, the communication components 764 may comprise wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or comprise components operable to detect identifiers. For example, the communication components 764 may comprise radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (e.g., 730, 732, 734, and/or memory of the processor [s] 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed examples.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to comprise, but not be limited to, solid-state memories, and optical and magnetic media, comprising memory internal or external to processors. Specific examples of machine-storage media, computer-storage media, and/or device-storage media comprise non-volatile memory, comprising by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may comprise a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) comprising 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component comprised in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to comprise any intangible medium that is capable of storing, encoding, or carrying the instructions 716 for execution by the machine 700, and comprise digital or analog communication signals or other intangible media to facilitate communication of such software. Hence, the terms "transmission medium" and "signal medium" shall be taken to comprise any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to comprise both machine-storage media and transmission media. Thus, the terms comprise both storage devices/media and carrier waves/modulated data signals.

What is claimed is:

1. A system comprising:
at least one hardware processor;
a non-transitory computer-readable medium storing instructions that, when executed by the at least one hardware processor, cause the at least one hardware processor to perform operations comprising:
receiving, at a database management system, a database transaction;
splitting the database transaction into a plurality of independent sub-transactions comprising a first sub-transaction corresponding to an object in the database management system and a second sub-transaction corresponding to an object in a remote open table format storage system separate and distinct from the database management system;
recording the second sub-transaction in a metastore of the database management system;
sending the second sub-transaction to the remote open table format storage system for execution and updating of the second object;
updating the first object on in the database management system by executing the first sub-transaction;
based on a determination that either the updating of the first object or the updating of the second object has failed, performing a plurality of compensation transactions to restore the first object and the second object to earlier states, the compensation transaction to restore the second object being based on data in the metastore; and
clearing all data from the metastore.

2. The system of claim 1, wherein the plurality of independent sub-transactions further comprises a third sub-transaction corresponding to an object in a second remote open table format storage system separate and distinct from the database management system and the remote open table format storage system.

3. The system of claim 1, wherein the database management system is an in-memory database management system.

4. The system of claim 1, wherein the first sub-transaction and the second sub-transaction are both DDL transactions.

5. The system of claim 1, wherein the first sub-transaction acts to update a virtual table in the database management system when executed.

6. The system of claim 1, wherein the operations further comprise:

performing one or more additional sub-transactions on the database management system; and
wherein the determination comprises a determination that any of the updating of the first object, the updating of the second object, or the performing of the one or more additional sub-transactions has failed.

7. The system of claim 1, wherein the first sub-transaction and the second sub-transaction are performed asynchronously.

8. A method comprising:
receiving, at a database management system, a database transaction;
splitting the database transaction into a plurality of independent sub-transactions comprising a first sub-transaction corresponding to an object in the database management system and a second sub-transaction corresponding to an object in a remote open table format storage system separate and distinct from the database management system;
recording the second sub-transaction in a metastore of the database management system;
sending the second sub-transaction to the remote open table format storage system for execution and updating of the second object;
updating the first object on in the database management system by executing the first sub-transaction;
based on a determination that either the updating of the first object or the updating of the second object has failed, performing a plurality of compensation transactions to restore the first object and the second object to earlier states, the compensation transaction to restore the second object being based on data in the metastore; and
clearing all data from the metastore.

9. The method of claim 8, wherein the plurality of independent sub-transactions further comprises a third sub-transaction corresponding to an object in a second remote open table format storage system separate and distinct from the database management system and the remote open table format storage system.

10. The method of claim 8, wherein the database management system is an in-memory database management system.

11. The method of claim 8, wherein the first sub-transaction and the second sub-transaction are both DDL transactions.

12. The method of claim 8, wherein the first sub-transaction acts to update a virtual table in the database management system when executed.

13. The method of claim 8, further comprising:
performing one or more additional sub-transactions on the database management system; and
wherein the determination comprises a determination that any of the updating of the first object, the updating of the second object, or the performing of the one or more additional sub-transactions has failed.

14. The method of claim 8, wherein the first sub-transaction and the second sub-transaction are performed asynchronously.

15. A non-transitory machine-readable medium storing instructions which, when executed by one or more processors, cause the one or more processors to perform operations comprising:
receiving, at a database management system, a database transaction;
splitting the database transaction into a plurality of independent sub-transactions comprising a first sub-transaction corresponding to an object in the database management system and a second sub-transaction corresponding to an object in a remote open table format storage system separate and distinct from the database management system;

recording the second sub-transaction in a metastore of the database management system;

sending the second sub-transaction to the remote open table format storage system for execution and updating of the second object;

updating the first object on in the database management system by executing the first sub-transaction;

based on a determination that either the updating of the first object or the updating of the second object has failed, performing a plurality of compensation transactions to restore the first object and the second object to earlier states, the compensation transaction to restore the second object being based on data in the metastore; and clearing all data from the metastore.

16. The non-transitory machine-readable medium of claim 15, wherein the plurality of independent sub-transactions further comprises a third sub-transaction corresponding to an object in a second remote open table format storage system separate and distinct from the database management system and the remote open table format storage system.

17. The non-transitory machine-readable medium of claim 15, wherein the database management system is an in-memory database management system.

18. The non-transitory machine-readable medium of claim 15, wherein the first sub-transaction and the second sub-transaction are both DDL transactions.

19. The non-transitory machine-readable medium of claim 15, wherein the first sub-transaction acts to update a virtual table in the database management system when executed.

20. The non-transitory machine-readable medium of claim 15, wherein the operations further comprise:

performing one or more additional sub-transactions on the database management system; and wherein the determination comprises a determination that any of the updating of the first object, the updating of the second object, or the performing of the one or more additional sub-transactions has failed.

* * * * *